No. 894,787. PATENTED JULY 28, 1908.
L. E. WATERMAN.
CULTIVATOR.
APPLICATION FILED FEB. 3, 1908.
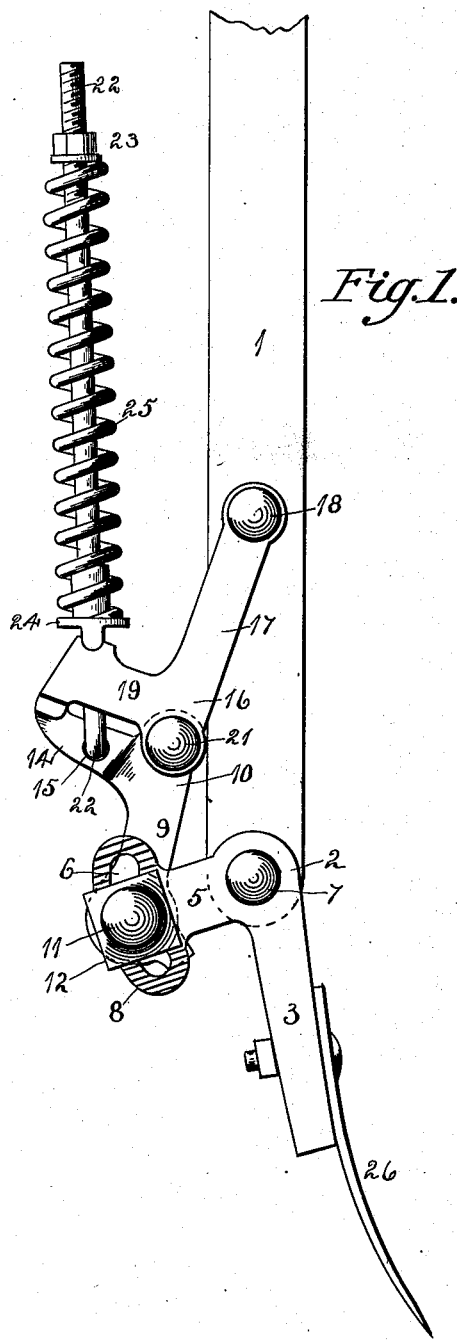
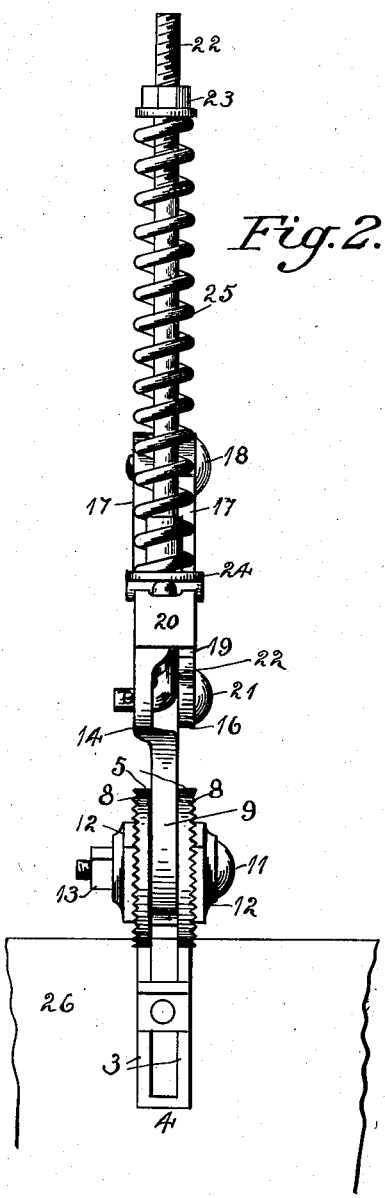
Witnesses:
J. S. Clark
E. Behel.
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

CULTIVATOR.

No. 894,787.　　　Specification of Letters Patent.　　Patented July 28, 1908.

Application filed February 3, 1908. Serial No. 414,052.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

The object of this invention is to construct a spring trip for cultivator shovels, and one which will return to its normal position after passing over an obstruction.

In the accompanying drawings, Figure 1 is an elevation of my improved spring trip with the parts in their normal or working positions. Fig. 2 is a rear elevation of the same.

The shovel standard 1 in this instance is of flat bar form, and to its lower end is pivotally connected a bifurcated bell crank 2 composed of the arms 3 united by the cross bar 4, and the rearwardly extending branches 5, each of which is formed with a slot 6 concentric with the pivot rivet 7. The outer faces of these branches 5 are provided with serrations 8. Between the branches 5 is located an arm 9 of a bell crank 10, and through this arm is passed a bolt 11 which also passes through serrated faced plates 12 located in contact with the outer faces of the branches 5, and a nut 13 clamps the plates to the branches which holds the bolt from displacement. This bolt 11 forms a pivotal connection of the arm 9, with the branches 5. The arm 14 of the bell crank 10 has an extended surface and is also provided with an opening 15.

To the shovel standard 1 above the pivot rivet 7 is pivoted a bell-crank 16. This bell-crank is bifurcated and the two arms 17 straddle the shovel standard, and a rivet 18 connects the arms to the standard in a pivotal manner. The arms 19 of the bell-crank 17 are connected by a cross bar 20. The center of the bell-crank 16 is pivotally connected to the angle portion of the bell-crank 10 by the rivet 21.

A rod 22 has its lower end in hook form and placed in the hole 15 in the arm 14 of the bell-crank 10, and extends upward between the arms 19 of the bell-crank 16. A nut 23 is placed on the screw-threaded upper end of this rod. A washer 24 is placed on the rod 22 and its lower portion is rounded and seated in recesses formed in the upper edges of the arms 19. A coiled spring 25 surrounds the rod, and is located between the washer 24 and nut 23.

A cultivator shovel 26 has a connection with the arms 3, of the bell-crank 2.

When the shovel is in working position the parts are in the positions shown at Fig. 1. The spring acting to hold the shovel to its work. Should the shovel strike an obstruction it will yield rearward which will move the bell-crank on its pivotal connection with the shovel standard. This movement will flex the bell-crank 10 in its connection with the bell-crank 16 which will separate the arm 14 of the bell-crank 10 and the arms 19 of the bell-crank 16 thereby compressing the spring 25. When the obstruction has been passed the spring will return the shovel and other parts to their normal or working positions.

The position of the shovel with relation to the shovel standard can be changed by means of the bolt 11 which can be moved in the slots 6.

I claim as my invention.

1. A spring trip comprising a standard, a support pivoted to the standard and having a rearwardly extending branch, a bell-crank pivoted to the standard, an intermediate bell-crank having an arm pivoted to the rearwardly extending branch, a pivotal connection between the bell-cranks at their angle portions, and a spring exerting its force to hold the free arms of the bell-cranks in contact.

2. A spring trip comprising a standard, a support pivoted to the standard and having a rearwardly extending branch, a bell-crank pivoted to the standard, an intermediate bell-crank having an arm pivoted to the rearwardly extending beam in an adjustable manner, a pivotal connection between the bell-cranks at their angle portions, and a spring exerting its force to hold the free arms of the bell-cranks in contact.

In testimony whereof I have hereunto set my hand in presence of two subscribing witnesses.

LEWIS E. WATERMAN.

Witnesses:
A. O. BEHEL,
E. D. E. N. BEHEL.